March 7, 1950  L. R. MacLEOD  2,499,766
DUST CONVEYING
Filed Nov. 30, 1948
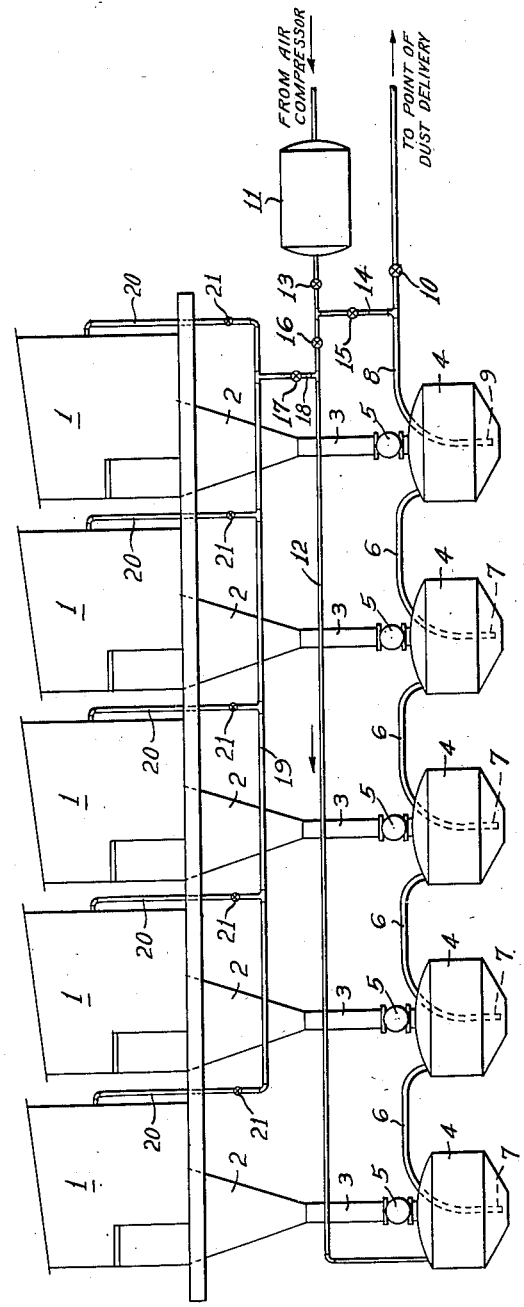
INVENTOR.
Lester R. MacLeod
BY
ATTORNEYS Patented Mar. 7, 1950

2,499,766

UNITED STATES PATENT OFFICE 2,499,766

DUST CONVEYING

Lester R. MacLeod, Dumont, N. J.

Application November 30, 1948, Serial No. 62,668

6 Claims. (Cl. 302—27)

This invention relates to dust conveying, and is especially directed to the provision of improved apparatus for conveying dry dust from a series of dust collecting chambers to a single delivery point which may be either nearby to the collecting chambers or distant therefrom. The apparatus of the invention makes use of a series of dust blowing tanks, each of which receives dust from one of the collecting chambers, and the dust received in any one tank is transferred to the delivery point by passing it serially through the succeeding tanks in the series.

The apparatus of the invention may be used with advantage in conveying dry metallurgical dust from the collecting chambers of a bag house installation, or from the collecting chambers of an electrostatic dust precipitation installation, either (1) directly to bins for storage or for feeding dust-treating or dust-packaging apparatus, or (2) to a central delivery point from which it may subsequently be transferred to such bins. Heretofore, when dust has been collected in a series of neighboring collecting chambers, the practice has been to use screw conveyors or similar mechanical conveyors to carry the dust from the collecting chambers to a nearby delivery point, from which it has then been transported to the storage or other bins. Such conveyors cannot be built economically for carrying dust any very great distance; hence the need for a nearby delivery point. Metallurgical dusts, moreover, are very abrasive and cause rapid wear of the bearings and other closely fitted parts of such conveyors. The pneumatic arrangement of the invention eliminates such wear and so reduces greatly the cost of maintenance and repair on the conveying apparatus.

Dust conveying apparatus in accordance with the invention, by which dust is conveyed from a series of dust collecting chambers to a single delivery point, comprises a series of dust blowing tanks (i. e. tanks from which a load of dust may be discharged by compressed air) each of which is connected by a dust-charging conduit to one of the series of dust collecting chambers. The charging conduits are provided with valves so that dust may be passed intermittently, as desired, from the chambers to the tanks. Each tank (except the last in the series) is connected to the next in the series by a dust transfer pipe which communicates with the interior near the bottom of the tank earlier in the series and with the interior near the top of the tank later in the series. A valved dust offtake conduit connects the last tank in the series, at a point near its bottom, with the point of dust delivery. The upper interior of the first tank in the series is connected to a source of compressed air by a valved air pipe. With this arrangement, when the valves in the dust-charging conduits are closed and when the valves in the dust offtake conduit and in the air pipe are opened, air under pressure flows from the compressed air source to the interior of the first tank in the series and causes the dust in each tank to flow through the dust transfer conduits and the tanks subsequent in the series and thence through the dust offtake conduit to the delivery point.

Since in the new dust conveying apparatus the dust is handled pneumatically in tanks and pipes, and does not come in contact with closely fitting movable conveyor parts, wear and damage due to dust abrasion is reduced to a minimum. Also of importance is the fact that the connection of the blowing tanks in series greatly simplifies the arrangement of the piping for handling the dust and the compressed air, and makes for very easy control of the dust conveying operation. Further, it permits handling different amounts of dust from the different collecting chambers with much greater ease than if a separate pneumatic conveying system is employed for each collecting chamber.

The single figure of the accompanying drawing shows diagrammatically a dust conveying installation embodying the invention. In this installation a series of dust collecting chambers 1 (which may collect the dust from different sections of a bag house or of an electrostatic precipitator, or from other apparatus) are provided with hopper bottoms 2 which are connected by charging conduits 3 to a series of dust blowing tanks 4. Each charging conduit is provided with a valve 5 for controlling the flow (by gravity) of dust from the collecting chambers into the tanks. The tanks are completely enclosed, and when the valves 5 are closed are capable of holding air at a pressure of, say, 90 pounds per square inch.

Each tank 4, except the last in the series, is connected to the next in the series by a dust transfer pipe 6. One end 7 of each dust transfer pipe opens to the interior near the bottom of the tank earlier in the series, and its other end opens into the interior of the next tank in the series near its top. A dust offtake conduit 8, one end 9 of which opens to the interior of the last tank in the series near its bottom, connects this last tank with the point to which dust from the tanks is to be delivered. A valve 10 is provided in the dust offtake pipe.

A source of compressed air (shown in the form of a receiver 11 which is kept filled to some desired pressure by an air compressor) is connected by a main air pipe 12 to the interior of the first tank in the series near its top. A main air valve 13 is provided to control the flow of air from the receiver through the main air pipe. A branch pipe 14 connects the air pipe 12 (or alternatively the receiver 11) with the dust offtake pipe 8 at a point between the dust offtake valve 10 and the last tank in the series. A control valve 15 in this branch pipe, and a control valve 16 in the main air pipe, are provided so that the flow of air from the receiver may be directed either through the main air pipe 12 to the first tank in the series, or through the branch pipe and the dust offtake pipe to the last tank in the series.

In order to vent compressed air from the blowing tank system, the main air supply pipe is connected through a vent valve 17 in a vent pipe 18 to a vent header 19. The header is connected through a series of branch pipes 20 to the interiors of the dust collecting chambers 1. Valves 21 in these branch pipes are provided to shut off the header 19 from any collecting chamber that may be temporarily out of service. The pressure within the collecting chambers 1 is normally slightly below atmospheric, and the above-described vent system prevents loss of any dust that may escape through the vent valve 17. Instead of connecting the branch pipes 20 directly to the dust collecting chambers 1, they may be connected to whatever other part of the dust collecting system is most convenient.

Operation of the apparatus is as follows: Dust that collects in the collecting chambers 1 is passed by gravity flow through the dust-charging conduits 3 into the blowing tanks 4, the valves 5 being opened for this purpose. The vent valve 17 may also be opened during this operation to permit escape of air displaced from the blowing tanks by the incoming charge of dust, and to insure that the pressure in the blowing tanks is substantially the same as in the collecting chambers. As a sufficient charge of dust is accumulated in each tank, the corresponding charge valve 5 is closed, and when all of these tanks are filled to the desired extent and all of the valves 5 are closed, the system is ready for conveying dust to the point of delivery.

To facilitate pneumatic transfer of the dust from tank to tank and through the offtake conduit, it is often best to first "fluidize" the dust (i. e. to render it easily mobile in the manner of a fluid). This is accomplished by leaving the bent valve 17 open, opening the control valve 15 in the branch pipe 14, closing the dust offtake valve 10 and the control valve 16 in the main air pipe, and then opening the main air valve 13. Thereupon compressed air flows through the dust offtake pipe 8 and up through the dust accumulated in the last blowing tank in the series. Then the air passes through the dust transfer pipe and up through the dust is the next-to-last tank in the series; and so it flows ultimately to and through the dust in the first tank in the series and finally out through the vent valve 17. The upward flow of the compressed air through the dust in each tank accomplishes the desired fluidizing. Since the vent pipe is connected to the dust collecting chambers (or to some other part of the dust collecting apparatus), any dust that escapes through the vent valve during the fluidizing operation is not lost from the system.

It is not always necessary to have the vent valve opened during the fluidizing operation. Even with the vent valve closed air will flow into each blowing tank upwardly through the dust therein until the pressure in each tank equals the pressure in the compressed air source, and in many cases the amount of air admitted under such conditions adequately fluidizes the dust. For that matter, it is not always necessary to cause any flow of air up through the dust in the blowing tanks 4 to fluidize it preparatory to forcing it out through the offtake conduit. The physical characteristics of the particular dust being handled determines whether in any given case preliminary fluidizing is necessary, or is merely advantageous without being necessary, or is of no substantial value.

Next, to convey the dust to the point of delivery, the vent valve 17 and the control valve 15 in the branch pipe 14 are closed, and the dust offtake valve 10 and the control valve 16 in the main air pipe are opened. As a result the direction of the flow of compressed air is reversed, so that it passes directly from the receiver 11 into the upper interior of the first tank in the series through the main air pipe 12. The effect of the compressed air when thus admitted above the charge of dust in this first tank is to force the dust, with some air, to flow through the dust transfer pipe into the second tank in the series. The flow of dust and air into the second tank acts on the charge of dust therein to cause it to flow through the next dust transfer pipe into the third tank in the series. In this manner the dust flows serially from each tank through the subsequent tanks in the series and finally through the dust offtake pipe to the point of delivery. When all (or any desired portion) of the dust has thus been discharged from the series of tanks, the main air valve 13 is closed and the vent valve 17 is opened. The tanks are then ready to receive new charges of dust through the dust-charging conduits upon opening the valves 5.

A particular advantage of the invention is that the series arrangement of the tanks enables the entire group of tanks to be completely discharged at any desired time without regard to the extent to which any one tank is filled, and with a minimum of manipulative steps. Consequently the new conveying arrangement is well adapted to automatic operation by a control system that is set in action whenever any one tank is filled to capacity, or that is set in action with each elapse of a predetermined time interval, or that is otherwise set in action. Since the new apparatus involves no moving parts that come in contact with the dust being conveyed, maintenance and repair costs are kept at a minimum, and the life of the apparatus is much longer than is that of such mechanical dust-handling equipment as screw conveyors.

Particular reference is made above and in the claims below to the use of compressed air as the medium in which the dust is carried. Compressed air is in fact preferred in cases where it can be used because it is readily available and is inexpensive, but conditions may sometimes prevail when another gas is more satisfactory than air. For example, if the dust being conveyed is combustible or subject to damage by oxidation, then in place of air an inert gas such as nitrogen or carbon dioxide is advantageously used. There may also be cases when the use of a reducing gas such as hydrogen or carbon monoxide is desirable. Dry steam may be used when it is advantageous to keep the dust hot. In view of these possible substitutions, references herein to the use of air are to be construed as admitting of the use of some other gas in its place. The mode of operation of the new dust conveying apparatus is not affected by using some other gas than air.

I claim:

1. Apparatus for conveying dust from a series of dust collecting chambers to a single delivery point comprising a series of dust blowing tanks each of which is connected to one of such chambers by a valved conduit through which dust may be passed intermittently from the chamber to the tank, a dust transfer pipe communicating at one end with the interior of each tank (except the last in the series) at a point near its bottom and connected at its other end to the next tank in the series near the top thereof, a valved dust offtake conduit connecting the interior of the last tank in the series at a point near its bottom with said single delivery point, a source of air under pressure, and a valved air pipe connecting said source with the upper interior of the first tank in the series, whereby, when the valves in the conduits connecting the tanks with the chambers are closed and the valves in the air pipe and dust offtake conduit are opened, air flowing from the source to the interior of the first tank causes the dust in each tank to flow serially through the dust transfer conduits and the tanks subsequent in the series and through the dust offtake conduit to the delivery point.

2. In apparatus for conveying dust from a series of dust collecting chambers to a single dust delivery point, a series of dust blowing tanks, each tank being connected with one of said chambers, whereby it may intermitently receive dust from the chamber with which it is connected, a dust transfer pipe connecting each tank (except the last in the series) to the next in the series, each dust transfer pipe extending from the interior near the bottom of the tank earlier in the series to the interior near the top of the tank later in the series, a dust offtake conduit connecting the interior of the last tank in the series near its bottom with said single dust delivery point, a source of compressed air, and an air pipe connecting said source with the upper interior of the first tank in the series, whereby compressed air entering the first tank in the series through said air pipe causes the dust in each tank to flow serially through the succeeding tanks in the series and through the dust offtake pipe to the dust delivery point.

3. In dust conveying apparatus of the character described, a plurality of dust blowing tanks, a valved dust charging conduit connected to each tank and through which each tank may receive independently a charge of dust, said tanks being connected in series by a plurality of dust transfer conduits each of which connects the interior of one tank near its bottom with the interior of the next tank in the series near its top, a dust offtake conduit connecting the interior of the last tank in the series near its bottom with a point of dust delivery, a source of compressed air, and a valved air pipe connecting said source with the interior of the first tank in the series near its top, whereby, when the valves in the dust-charging conduits are closed and the valve in the air pipe is opened, compressed air from the source causes the dust in each tank to flow serially through the dust transfer conduits and tanks following it in the series and through the dust offtake conduit to the dust delivery point.

4. In dust conveying apparatus of the character described, a plurality of dust blowing tanks, a valved dust-charging conduit connected to each tank and through which each tank may receive independently a charge of dust, said tanks being connected in series by a plurality of dust transfer conduits each of which connects the interior of one tank near its bottom with the interior of the next tank in the series near its top, a valved dust offtake conduit connecting the interior of the last tank in the series near its bottom with a point of dust delivery, a source of compressed air, a first valved air pipe connecting said source with the interior of the first tank in the series near its top, and a second valved air pipe connecting said source with the interior of the dust offtake conduit at a point between the valve in said conduit and the last tank in the series, whereby when the valves in the dust-charging conduits are closed then upon closing the valve in the dust offtake conduit and the valve in the first air pipe and upon opening the valve in the second air pipe air is caused to flow from the source up through the dust in each tank, and upon reversing the settings of said dust offtake conduit valve and said air pipe valves compressed air from the source enters the first tank above the dust therein and causes the dust in each tank to flow serially through the succeeding tanks in the series and through the dust offtake conduit to the dust delivery point.

5. In dust conveying apparatus of the character described, a plurality of dust blowing tanks, a valved dust-charging conduit connected to each tank and through which each tank may receive independently a charge of dust, said tanks being connected in series by a plurality of dust transfer conduits each of which connects the interior of one tank near its bottom with the interior of the next tank in the series near its top, a valved dust offtake conduit connecting the interior of the last tank in the series near its bottom with a point of dust delivery, a source of compressed air, a first valved air pipe connecting said source with the interior of the first tank in the series near its top, a valved vent in said first air pipe between the valve therein and said first tank, and a second valved air pipe connecting the source with the interior of the dust offtake conduit at a point between the valve in said conduit and the last tank in the series, whereby upon closing the valves in the dust-charging conduits the dust in the tanks may be fluidized by closing the valve in the first air pipe and the valve in the offtake conduit and opening the vent valve and the valve in the second air pipe so as to cause air from the source to flow backwards through the series of tanks and up through the dust in each tank, and whereby dust may be caused to flow from each tank serially through the succeeding tanks in the series and through the offtake conduit to the point of dust delivery by reversing the settings of the four last-mentioned valves.

6. In apparatus of the character described, a dust collecting system including a series of dust collecting chambers, a corresponding series of dust blowing tanks, a valved dust-charging conduit connecting each dust blowing tank to one of said collecting chambers and through which each tank may receive independently a charge of dust from the collecting chamber to which it is thereby connected, a valved vent pipe connecting the interiors of the blowing tanks to the interior of the dust collecting system, whereby when the vent pipe valve is opened during charging of the blowing tanks with dust the pressure in said tanks is substantially equalized with the pressure in the dust collecting system, a plurality of dust transfer conduits each of which connects the interior of one tank near its bottom with the interior of the next tank in the series near its top, whereby all of said tanks are connected in series, a dust offtake conduit connecting the interior of the last tank in the series near its bottom with a point of dust delivery, a source of compressed air, and a valved air pipe connecting said source with the interior of the first tank in the series near its top, whereby when the valves in the dust-charging conduits are closed and the valve in the air pipe is opened compressed air from the source causes the dust in each tank to flow serially through the dust transfer conduits and tanks following it in the series and through the dust offtake conduit to the dust delivery point.

LESTER R. MacLEOD.

No references cited.